(12) United States Patent
Meyer et al.

(10) Patent No.: US 8,290,983 B2
(45) Date of Patent: Oct. 16, 2012

(54) SYSTEM AND METHOD FOR SEARCHING FOR DOCUMENTS

(75) Inventors: Ronald J. Meyer, Centerville, OH (US); Richard Ainsworth, Dublin, OH (US); Andrew Freisthler, Cincinnati, OH (US); Zachary W. Bennett, Centerville, OH (US); Mark C. Stiver, Brookville, OH (US); Jason Calton, Springboro, OH (US); Narasimha R. Edala, New Albany, OH (US); David James Miller, Dayton, OH (US); Donald Loritz, Springboro, OH (US)

(73) Assignee: LexisNexis Group, Miamisburg, OH (US)

( * ) Notice: Subject to any disclaimer, the term of this patent is extended or adjusted under 35 U.S.C. 154(b) by 417 days.

(21) Appl. No.: 12/285,764

(22) Filed: Oct. 14, 2008
(Under 37 CFR 1.47)

(65) Prior Publication Data
US 2009/0150827 A1 Jun. 11, 2009

Related U.S. Application Data

(60) Provisional application No. 60/960,793, filed on Oct. 15, 2007.

(51) Int. Cl.
*G06F 17/00* (2006.01)
(52) U.S. Cl. ......... 707/791; 707/802; 707/822; 707/828
(58) Field of Classification Search ........... 707/600–831
See application file for complete search history.

(56) References Cited

U.S. PATENT DOCUMENTS

| | | | |
|---|---|---|---|
| 5,819,260 A | 10/1998 | Lu et al. | |
| 5,926,811 A | 7/1999 | Miller et al. | |
| 5,960,422 A | 9/1999 | Prasad | |
| 7,209,915 B1 | 4/2007 | Taboada et al. | |
| 7,734,567 B2 * | 6/2010 | Okamoto et al. | 1/1 |
| 8,095,876 B1 * | 1/2012 | Verstak et al. | 715/273 |

(Continued)

FOREIGN PATENT DOCUMENTS
WO    WO 01/35274 A1    5/2001

OTHER PUBLICATIONS

Alex Iskold, "Overview of Clustering and Clusty Search Engine," Read White Web, Jan. 5, 2007, from http:/www.readwriteweb.com/archives/overview_of_clu.php (6 pgs.).

(Continued)

*Primary Examiner* — Isaac M Woo
(74) *Attorney, Agent, or Firm* — Finnegan, Henderson, Farabow, Garrett & Dunner, LLP

(57) ABSTRACT

A computer system is disclosed. The computer system includes one or more processors, and a memory storage storing one or more instructions for implementing a search tool. The instructions, when executed, instruct the computer system to perform a set of steps. The steps include receiving a search query from a user computer, the search query including one or more search terms to use to perform a first search. The steps further include, based on the one or more search terms, performing the first search, and providing for display at the user computer a list of one or more law-related documents responsive to the search query, a list of one or more recommended sources in which to perform a second search for documents, and a list of legal topics associated with the responsive documents.

7 Claims, 17 Drawing Sheets

U.S. PATENT DOCUMENTS

2006/0047656 A1* 3/2006 Dehlinger et al. ............ 707/6
2006/0287971 A1* 12/2006 Armstrong .................. 707/1

OTHER PUBLICATIONS

Westlaw, "Using Westlaw WebPlus" Research Fundamentals, from lawschool.westlaw.com, Jun. 2008, (2 pgs.).

The National Law Journal, "McNulty Memo on Attorney-Client Privilege Blasted For Lack of Change," Jan. 26, 2007, from http://web.archive.org/web/20070126061238/http://www.law.com, (2 pgs.).

Wendy Scott, "Thomson-West Launches Westlaw WebPlus Search Engine," Barclay Blog, Nov. 6, 2007 (1 pg.).

International Searching Authority, "International Search Report," dated Dec. 29, 2008, (5 pgs.) and International Searching Authority, "Written Opinion of the International Searching Authority" (9 pgs.) for PCT Application No. PCT/US2008/011695.

* cited by examiner

![Screenshot of Lexis Web BETA search results page showing search for "nepa compliance" with filter panel on left showing Legal Topic categories and results panel on right showing recommended sources and links.]

- 200: Browser window
- 210: Results area
- 220: Filter Your Results / Legal Topic panel
- 230: Suggest A Site area
- 240: Lexis Web BETA header
- 202: Subject area

Industry

Citations by Reporter

Code of Federal Regulations

United States Code Service, USCS (US)
- 42 U.S.C. 4321
- 42 U.S.C. 4332
- 16 U.S.C. 1531
- 16 U.S.C. 470
- 5 U.S.C. 551
- 42 U.S.C. 1251
- 5 U.S.C. 552
- 42 U.S.C. 7401
- 44 U.S.C. 3501
- 5 U.S.C. 706
- 16 U.S.C. 1451
- 42 U.S.C. 9601
- 5 U.S.C. 553
- 5 U.S.C. 551
- 16 U.S.C. 1536
- 30 U.S.C. 704
- 42 U.S.C. 811
- 42 U.S.C. 6901
- 42 U.S.C. 2000d
- 16 U.S.C. 470
- 5 U.S.C. 801

National Environmental Policy Act (NEPA) | Compliance and Enforcement | US EPA
... Environmental Policy Act (NEPA) Recent Additions | Contact. Hierarchical Links EPA Home > Compliance and Enforcement > National ... Statements EPA Compliance with NEPA The National Environmental Policy Act (NEPA) requires federal agencies...
http://www.epa.gov/compliance/nepa/

National Environmental Policy Act (NEPA) Home Page | Mid-Atlantic National Environmental Policy Act
... Assessment Program (EMAP) NEPA Sites Picture Highway construction project EPA NEPA The following links ...of Environmental Policy and Compliance U.S. Army Corps of Engineers... Navigation Mid-Atlantic NEPA Home Basic Information...
http://www.epa.gov/reg3esd1/nepa/

NEPA PDF
USDA, RURAL DEVELOPMENT Environmental Compliance Library National Environmental Policy Act as amended 1 42... deficiencies or inconsistencies therein which prohibit full compliance with the purposes and provisions of this Act and shall propose...
http://www.usda.gov/rus/water/ees/pdf/nepa.pdf Representative Cathy McMorris Rodgers :: Press Releases
...chair lift because of the delays associated with NEPA compliance. Renovation of the Fox Theater in downtown Spokane falls under NEPA and they had to complete a NEPA checklist" as part of the renovation process...
http://www.mcmorris.house.gov/pressreleases/2006/nepa_finalreport.html Compliance Assistance & Enforcement | Region 4 | US EPA
...You are here: EPA Home Region 4 Compliance Assistance & Enforcement Compliance Assistance & Enforcement Air Permitting ...and more Clean Air Act Enforcement and Compliance Assurance Recent enforcement actions...
http://www.epa.gov/region4/compliance/index.html Water and Environmental
...MISSION AREA'S ENVIRONMENTAL COMPLIANCE COURSE CATALOG Course Catalog...Considering Project Effects Under NEPA CONSIDERING PROJECT EFFECTS UNDER NEPA COURSE SCOPE This is a unique course tailored to NEPA practitioners who need more information.

320

SYSTEM AND METHOD FOR SEARCHING FOR DOCUMENTS

CLAIM TO PRIORITY

This application claims the benefit of priority to U.S. Provisional Application No. 60/960,793, filed on Oct. 15, 2007, which is incorporated herein by reference in its entirety.

TECHNICAL FIELD

The present disclosure is directed in general toward a system and method for searching for documents, and particularly toward a system and method for searching for law-related documents over a network.

BACKGROUND

Various databases and search tools exist for searching for and reviewing documents, such as law-related documents, over a computer network. For example, LexisNexis® has a proprietary product for searching statutes, case law, articles from legal publications, and other law-related documents, as do other private and governmental entities. Other search tools exist as well, such as online search tools for searching legal content or general content on the Internet (e.g., Law.com, Google.com, Clusty.com, etc.).

Some of these search tools permit users to perform a search and to filter the results according to certain categories. In addition, some existing search tools permit users to search for law-related documents on the Internet. However, these and other search tools leave room for improvement in order to provide a more user-friendly and effective search tool for searching for legal content on the Internet.

SUMMARY

The embodiments disclosed herein include new and improved search tool features that enhance the user searching experience and provide for more manageable, effective, and targeted searches.

In one embodiment, a computer system is disclosed. The computer system includes one or more processors, and a memory storage storing one or more instructions for implementing a search tool. The instructions, when executed, instruct the computer system to perform a set of steps. The steps include receiving a search query from a user computer, the search query including one or more search terms to use to perform a first search. The steps further include, based on the one or more search terms, performing the first search, and providing for display at the user computer a list of one or more law-related documents responsive to the search query, a list of one or more recommended sources in which to perform a second search for documents, and a list of legal topics associated with the responsive documents.

In another embodiment, a method for searching for documents is disclosed. The method includes receiving a first search query from a user computer, the first search query including one or more search terms. The method also includes, based on the one or more search terms, providing for display a set of one or more recommended sources in which to search for documents. The method additionally includes receiving a selection of a recommended source from the set of one or more recommended sources. The method further includes, based on the selection, executing a second search query in the selected recommended source, the second search query including the one or more search terms, and in response to the second search query, providing for display a list of one or more documents responsive to the second search query.

In a further embodiment, a method for searching for documents is disclosed. The method includes receiving a search query entered into a search query window, the search query including one or more search terms, determining a set of documents responsive to the search query, determining a set of citations cited in the set of documents, and providing for display the set of citations, so that the most frequent citation can be determined by a user by viewing a displayed list of the set of citations.

It is to be understood that both the foregoing general description and the following detailed description are exemplary and explanatory only and are not restrictive of the embodiments claimed.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Reference will now be made in detail to the disclosed embodiments, examples of which are illustrated in the accompanying drawings. Wherever possible, the same reference numbers will be used throughout the drawings to refer to the same or like parts.

Figure 1:
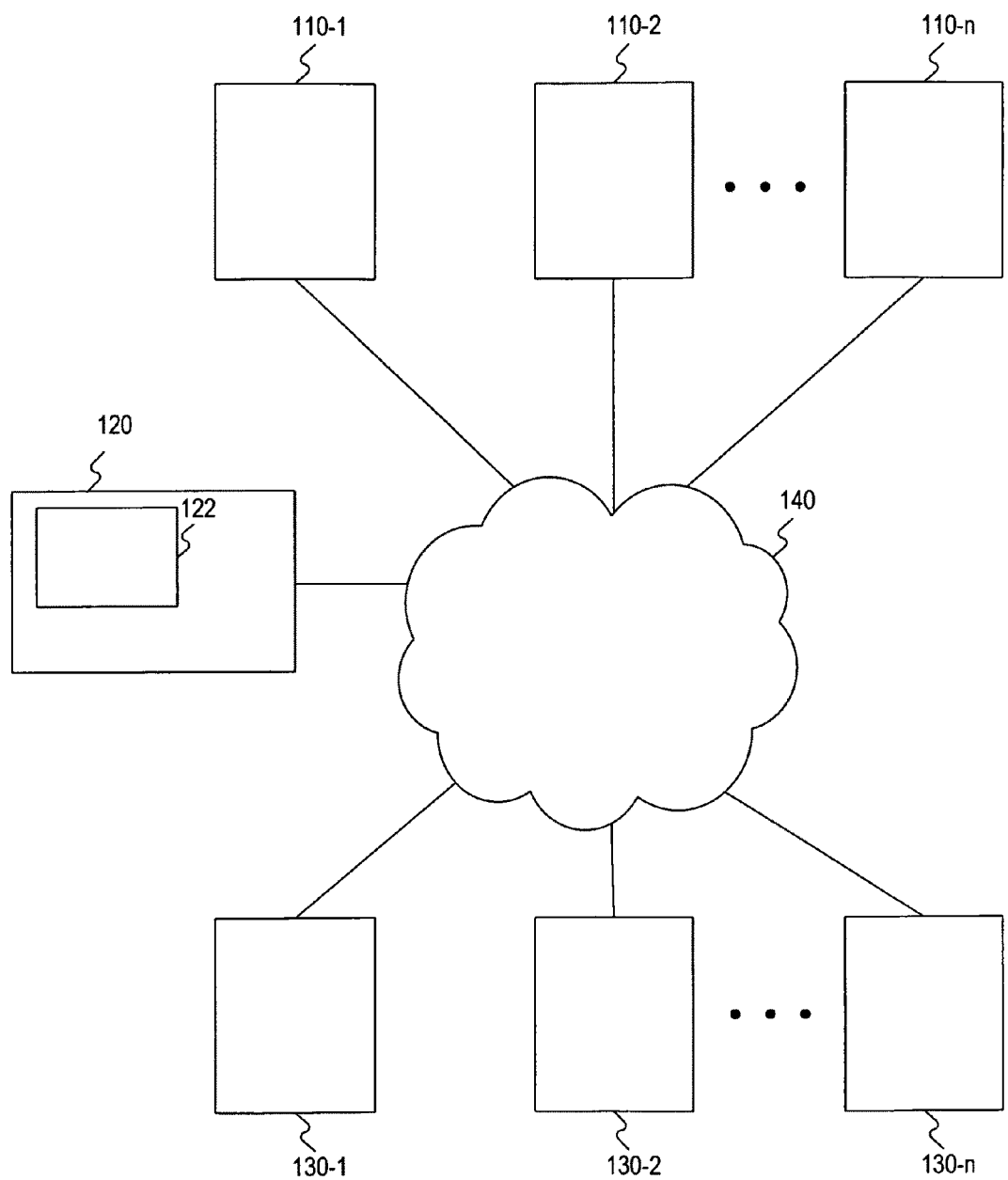
FIG. 1 illustrates an exemplary system for implementing a search tool, consistent with certain disclosed embodiments.

FIG. 1 depicts a system 100 in which the disclosed search tool may be implemented. System 100 may include, for example, documents 110-1, 110-2, etc., through 110-n, central computer system 120, which includes search tool 122, user computer systems 130-1, 130-2, etc., through 130-n, and network 140. System 100 may include additional components as well.

In one embodiment, documents 110-1 through 110-n may include any number of searchable documents that may be retrieved and viewed by a user. For example, each document 110-1 through 110-n may be stored on a storage system accessible via the Internet using a universal resource locator (URL) or other address identifier. Each document may thus be Web page or other document accessible via a URL or network 140. In one embodiment, copies of documents 110-1 through 110-n and/or document information associated with documents 110-1 through 110-n may be stored on central computer system 120. In a further embodiment, documents 110-1 through 110-n may be retrievable from publicly available sources (e.g., Web logs ("blogs"), online newspaper articles, government Websites, etc.), and may include any type of document accessible via the Internet (e.g., html documents, pdf documents, spreadsheet documents, word processing documents, etc.). In one embodiment, documents 110-1 through 110-n are law-related documents that relate to statutes, court cases, and/or other legal content.

Network 140 may be any computer network capable of storing and providing access to documents 110-1 through 110-n, and capable of connecting central computer system 120 and user computer systems 130-1 through 130-*n*. For example, in one embodiment, network 140 is a computer network such as the Internet.

Central computer system 120 may include one or more computers capable of providing access to documents 110-1 through 110-*n* and capable of communicating with user computer systems 130-1 through 130-*n*. Central computer system 120 may include any components typically associated with a search and retrieval information system, such as one or more processors, one or more storage devices, and one or more computer-readable media (e.g., memory storage) storing computer-readable instructions for implementing a search tool, such as search tool 122. The instructions may be implemented using one or more sets of computer language code (e.g., C++, Java, XML, AJAX, etc.). For example, in one embodiment, central computer system 120 may be a server system running a FAST ESP™ search platform. The server may collect and store, and/or provide access to documents 110-1 through 110-*n*. Central computer system 120 may include search tool 122 to allow users to search for and retrieve documents 110-1 through 110-*n*.

Search tool 122 may include computer-readable instructions implemented via one or more computer programs that permit users to search for and retrieve law-related documents according to the methods described herein. For example, in one embodiment, search tool 122 includes instructions for implementing a user interface, instructions for processing requests and commands received from a user via the user interface, and additional instructions for performing searches, retrieving information, and filtering results, as described further below. The instructions may be carried out, in certain embodiments, using software products and platforms such as, for example, Java™, Oracle™, AJAX, FAST ESP™, etc.

User computer systems 130-1 through 130-*n* may include one or more desktop computers, laptop computers, personal digital assistants (PDAs), cellular phones, or other processing devices capable of carrying out the methods disclosed herein. For example, in one embodiment, a user computer system 130-1 is a computer including one or more processors, one or more memory storage devices, one or more input devices (e.g., keyboard, mouse, touch pad, etc.), a display screen, a network interface, software (e.g., a Web browser program, associated plug-ins, word processing programs, etc.) configured to allow a user to access and use the search tool 122 described herein, and other components.

Although the figures and descriptions below are described with regard to law-related documents, the disclosed embodiments may apply to other systems that maintain searchable and retrievable documents.

The terms "law-related documents" or "legal content" as used herein refer to legal statutes, legal rules, court decisions, law-related blog entries, law-related magazine or newspaper articles, law-related electronic publications, and any other published material that relates to the law. Law-related documents may include documents from any source (e.g., government Web sites, private Web sites, subscription-based online sources, blog sites, newsgroups, etc.). The content of law-related documents may be scanned or otherwise analyzed (e.g., using a webcrawler, word or pattern recognition software, and/or similar technology) for particular terms, patterns, and/or categories of information (herein referred to as document information), which can be used to search for and filter search results. For example, a law-related document may relate to a particular subject (e.g., science and technology, law and legal systems, government and public administration, etc.); may include geographical information (e.g., continent, country, state, or other geographical references found in the document, such as a geographical region for the publication, a geographical location mentioned in the document content, etc.); may be related to a particular industry (e.g., energy and utilities, health care, etc.); may include company, person, or university information; may be in a particular language; may include certain keywords or phrases; may be from a particular source or type of source (e.g., online newspaper, online blog, or government website, or a particular Web site, particular blog, etc.); may include document data (e.g., HTML or other title, document size, character encoding, document date, etc.); and may include additional information or metadata.

Each law-related document may also be associated with one or more legal topics, and can thus be classified based on one or more fields of law (e.g., criminal law and procedure, computer and Internet law, governments, communications law, patent law, etc.). Each law-related document may also include citations to one or more sources and/or sections or sub-sections within those sources (e.g., reporters, statutes, sections within statutes, rules, sections within rules, court cases, websites, blog sites, etc.).

The document information for a particular document may be extracted, stored, and indexed so that the document can be searched for based on the information. The document information may be obtained from the document by using, for example, text or pattern recognition programmed to recognize certain text or patterns in the document content that match certain criteria (e.g., particular words, citation formats, numerical information, etc.), dictionaries, or other information matching processes.

In addition, each category of information associated with a document may have one or more sub-categories. For example, the subject "science and technology" may have one or more sub-categories (e.g., ecology and environmental science, engineering, earth and atmospheric science, biology, etc.) also associated with the document, and thus may be indexed in a hierarchical manner. The category and sub-category information about a law-related document can be stored and indexed so that the document can later be searched for based on the information, according to the embodiments disclosed herein.

In one embodiment, documents are collected based on administrator selection and/or webcrawler programs that collectively search the Web for law-related articles. For example, an administrator may visit certain sources, such as government websites, online newspapers, blogs, etc., that include legal content, and may use a webcrawler to add documents (e.g., web pages) retrieved from the sources to the set of documents 110-1 through 110-*n*. Accordingly those documents may be indexed based on their content (e.g., based on extracted document information) so that they can be retrieved in response to a search request. In a further embodiment, users may suggest to add certain documents (e.g., web pages) to the set of documents 110-1 through 110-*n* by, for example, submitting one or more URLs using a graphical user interface (GUI) as further described below.

An exemplary system and method for searching for law-related documents will now be described in connection with FIGS. 2*a*-2*n*.

Figure 2A:
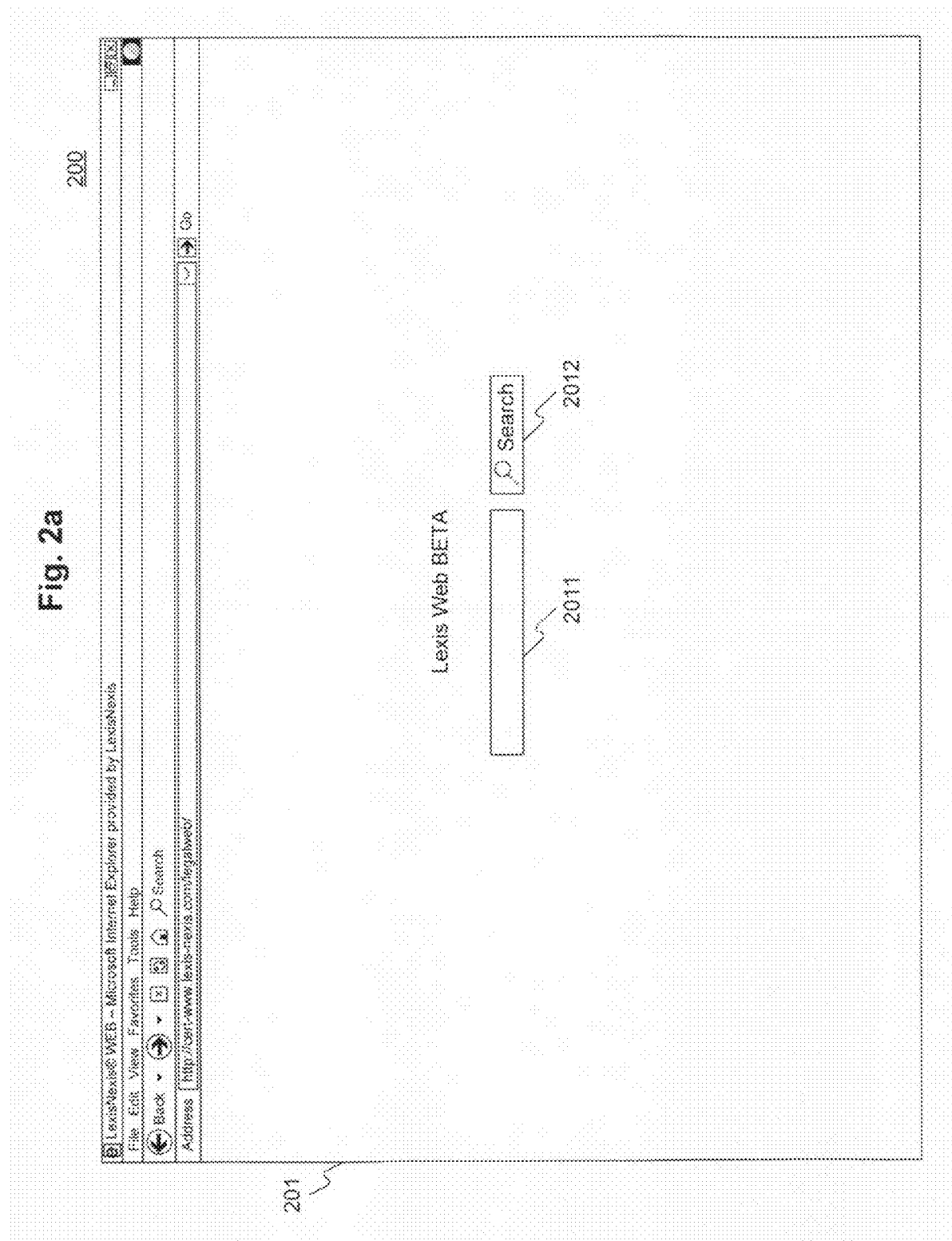
FIGS. 2a-2n illustrate different portions of an exemplary graphical user interface (GUI) for implementing a search tool, consistent with certain disclosed embodiments.
Figure 2B:
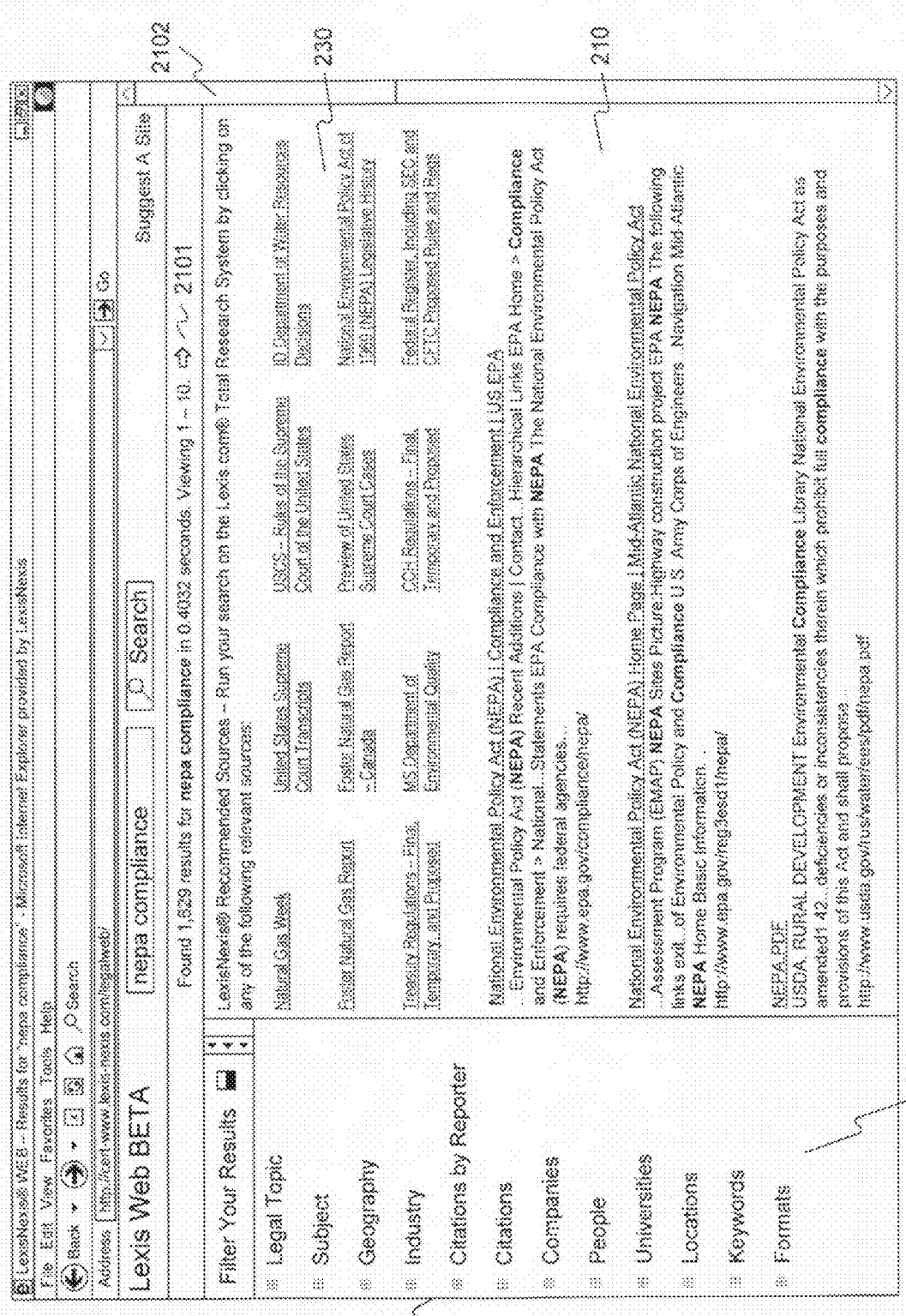
Figure 2C:
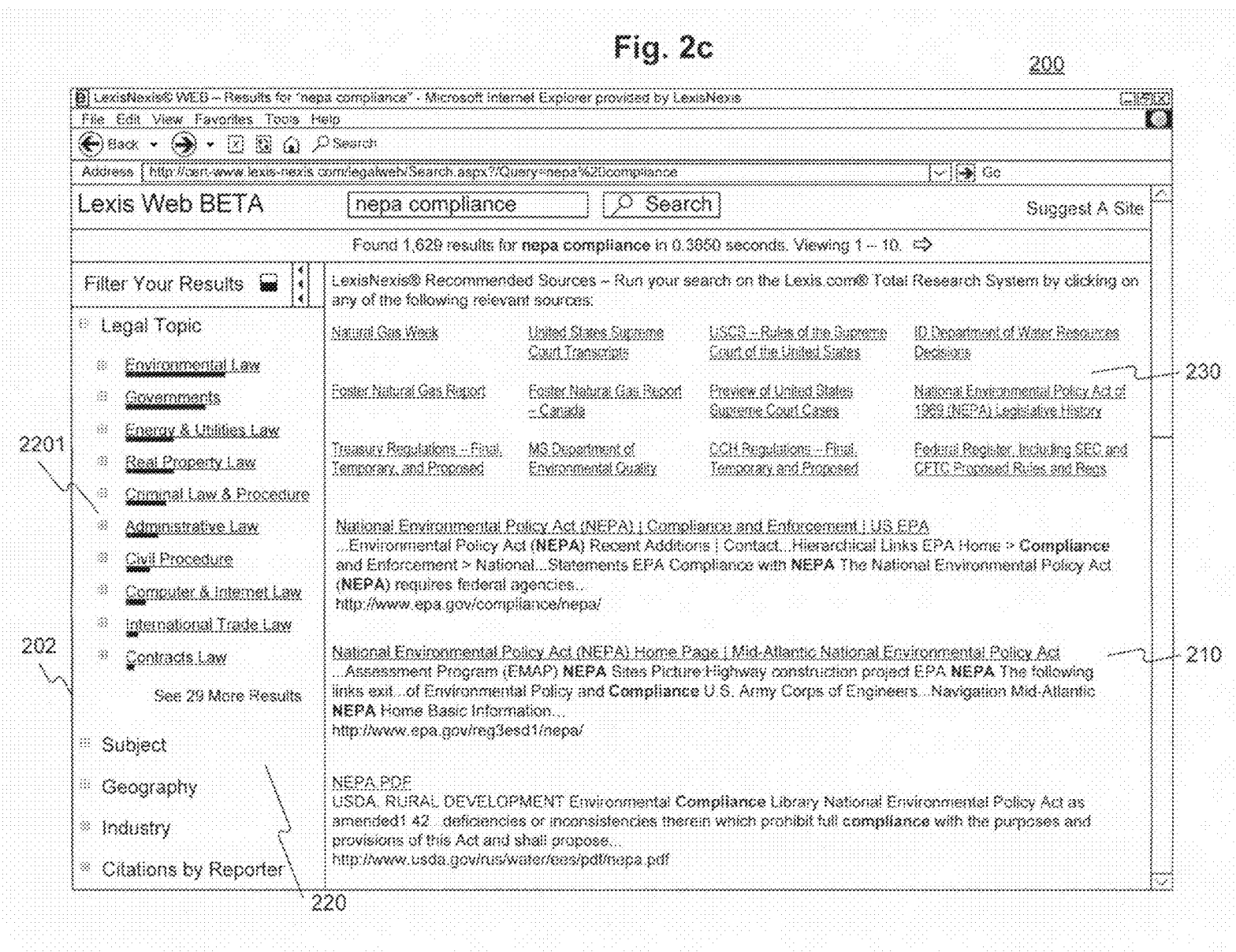
Figure 2D:
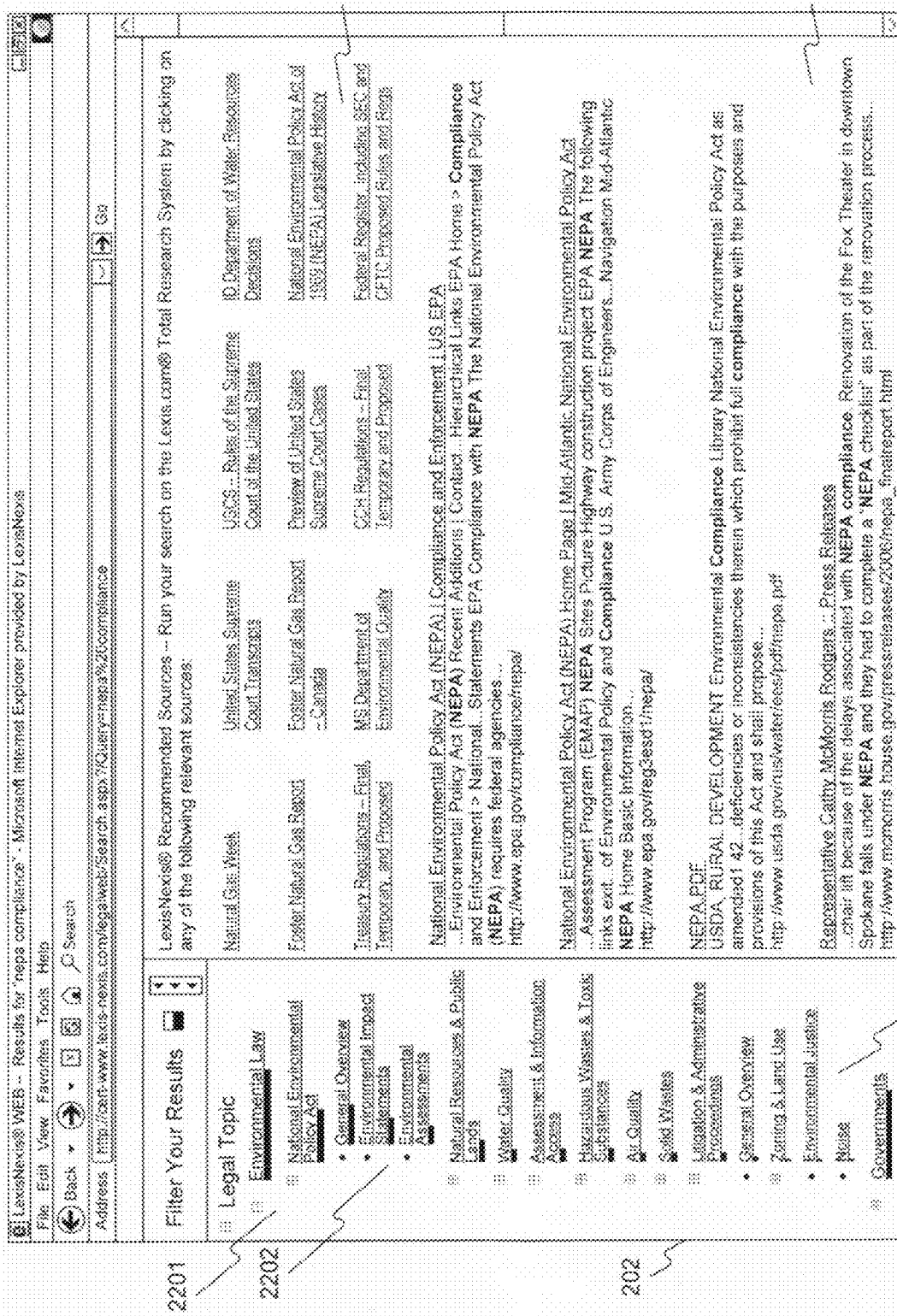
Figure 2F:
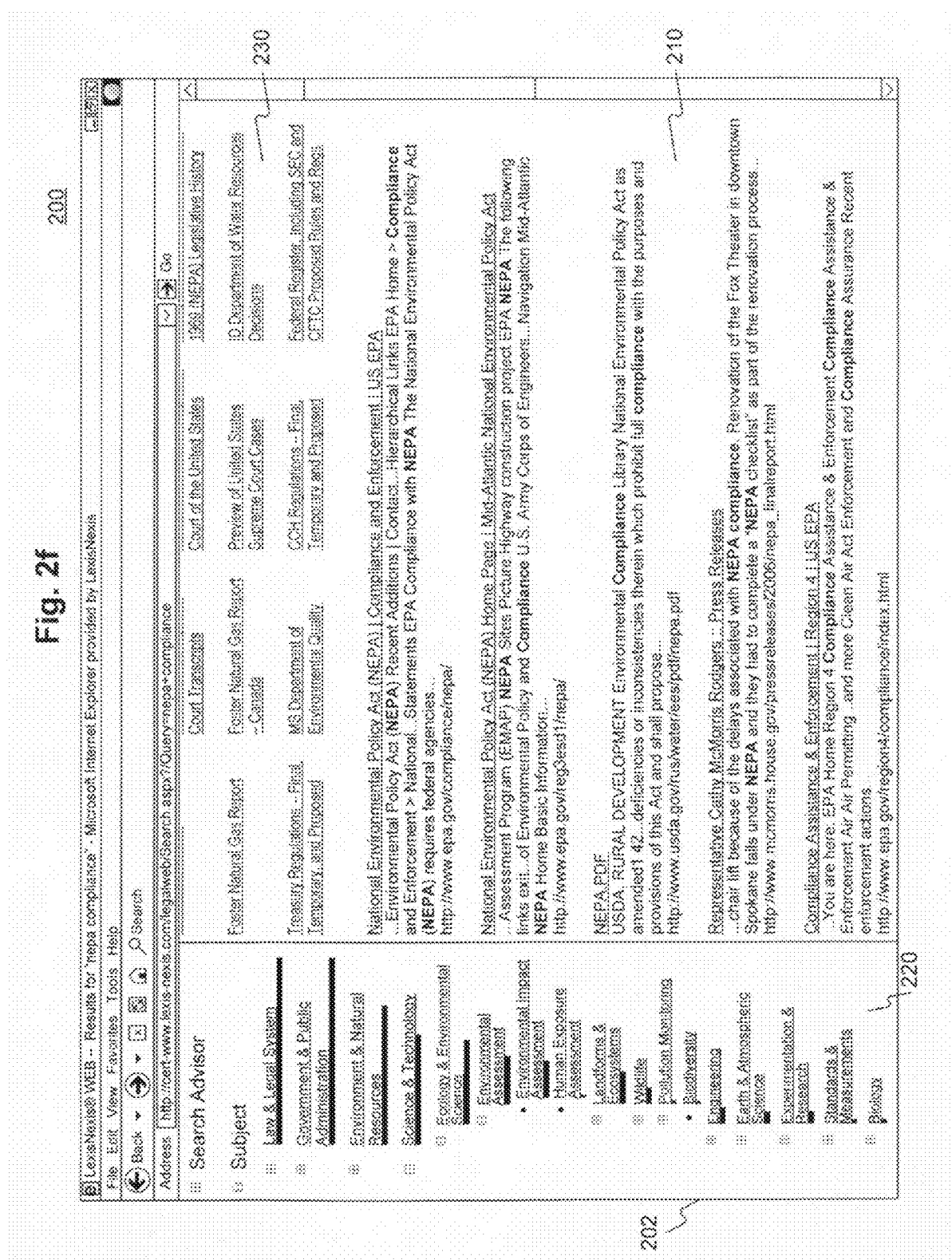
Figure 2G:
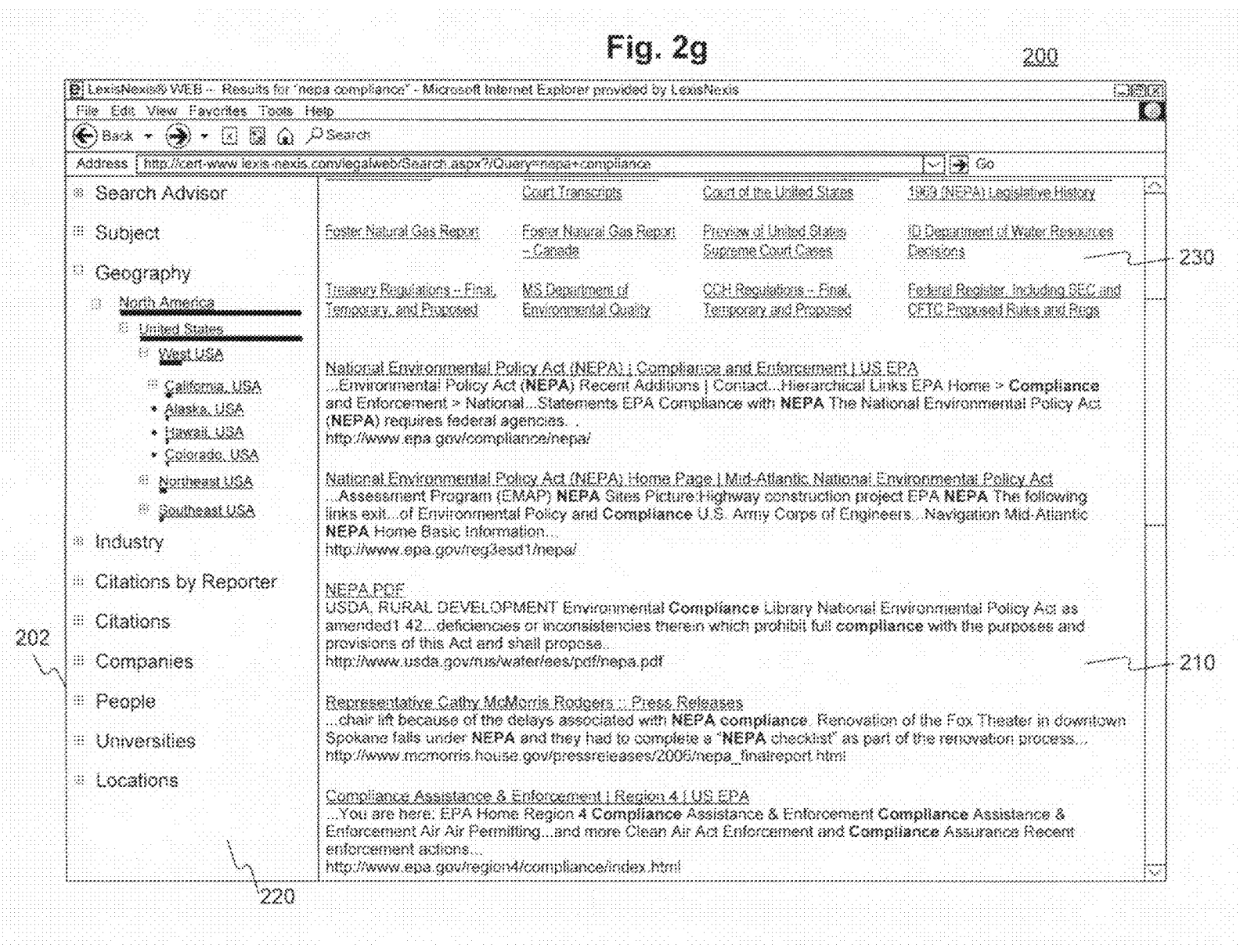
Figure 2H:
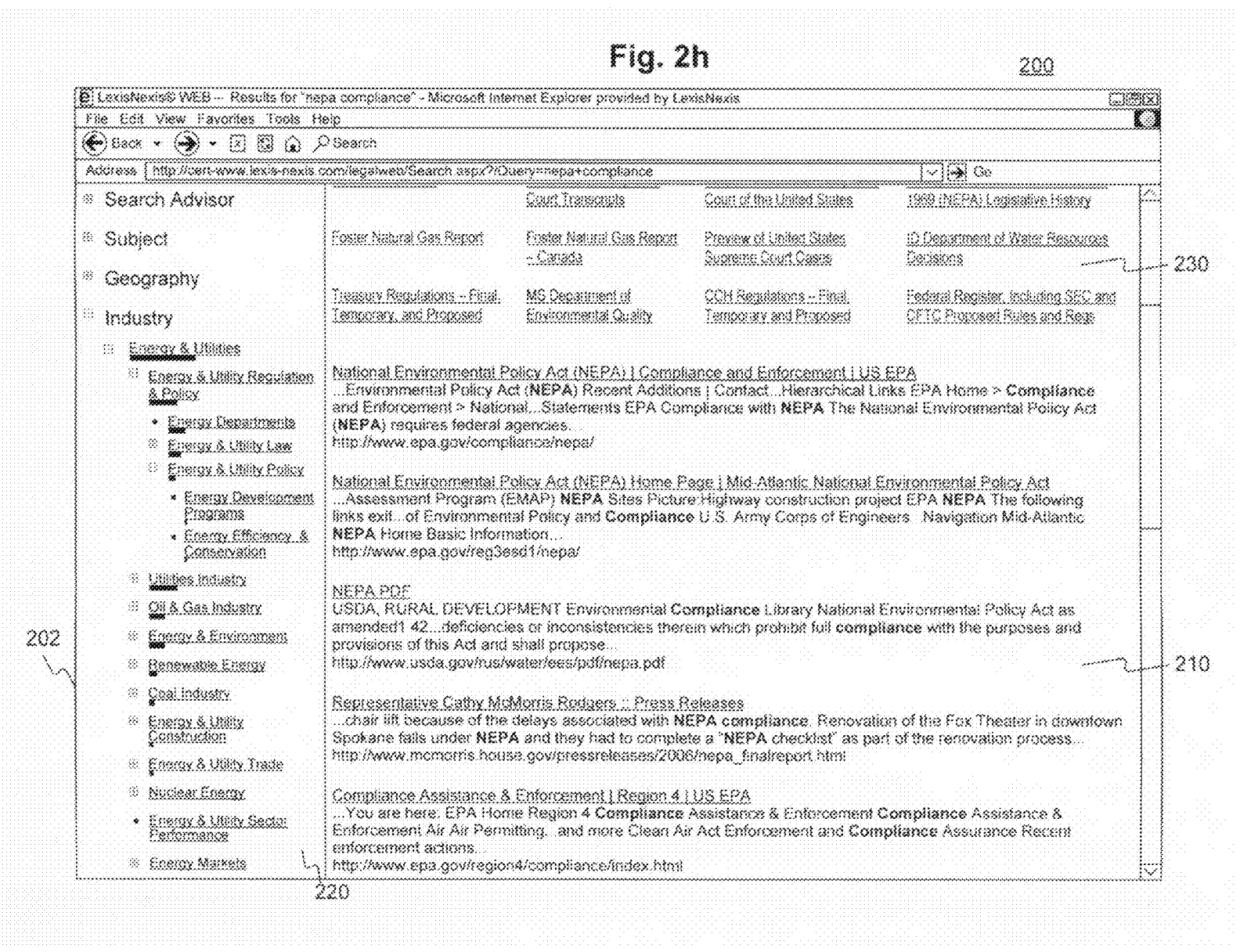
Figure 2J:
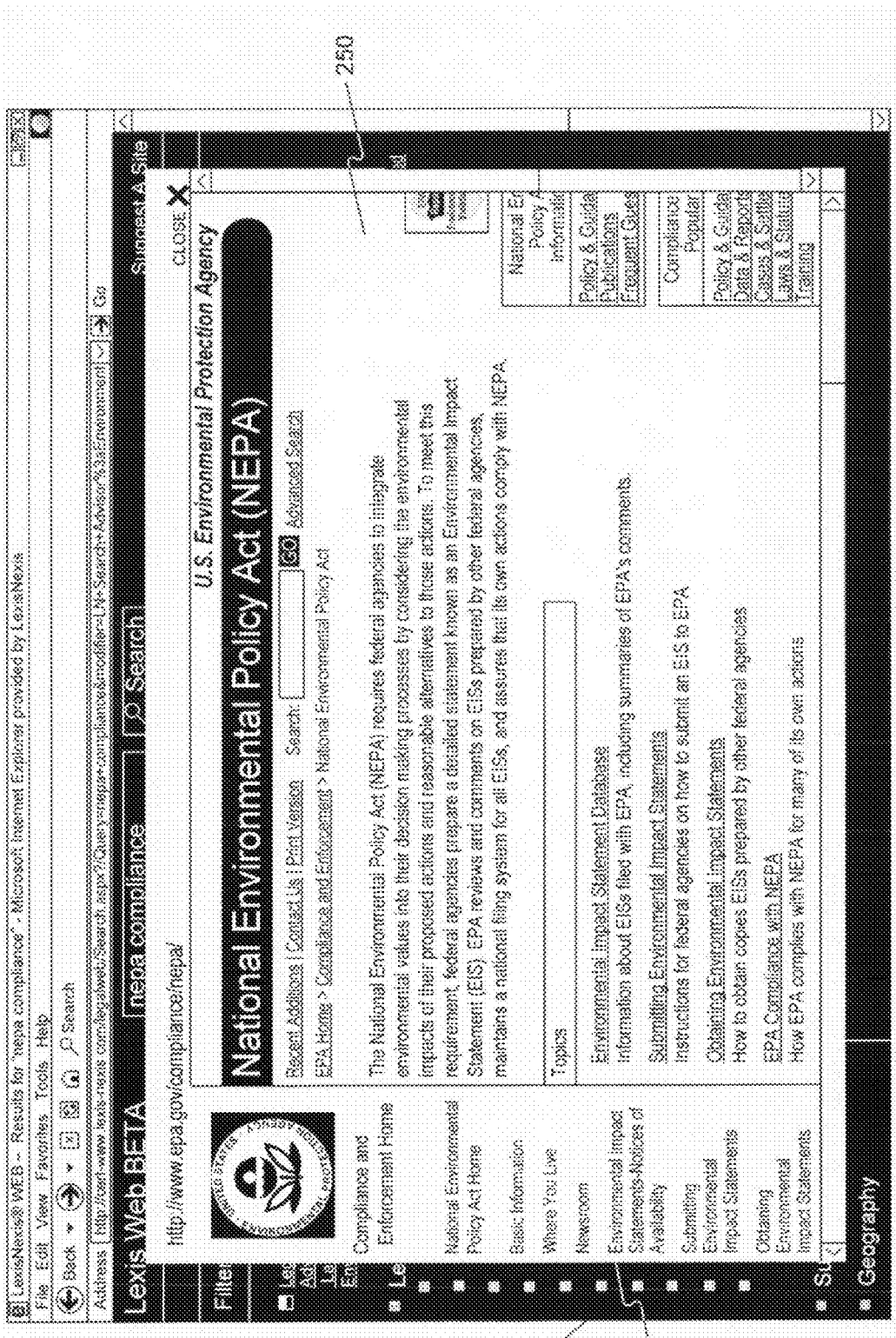
Figure 2K:
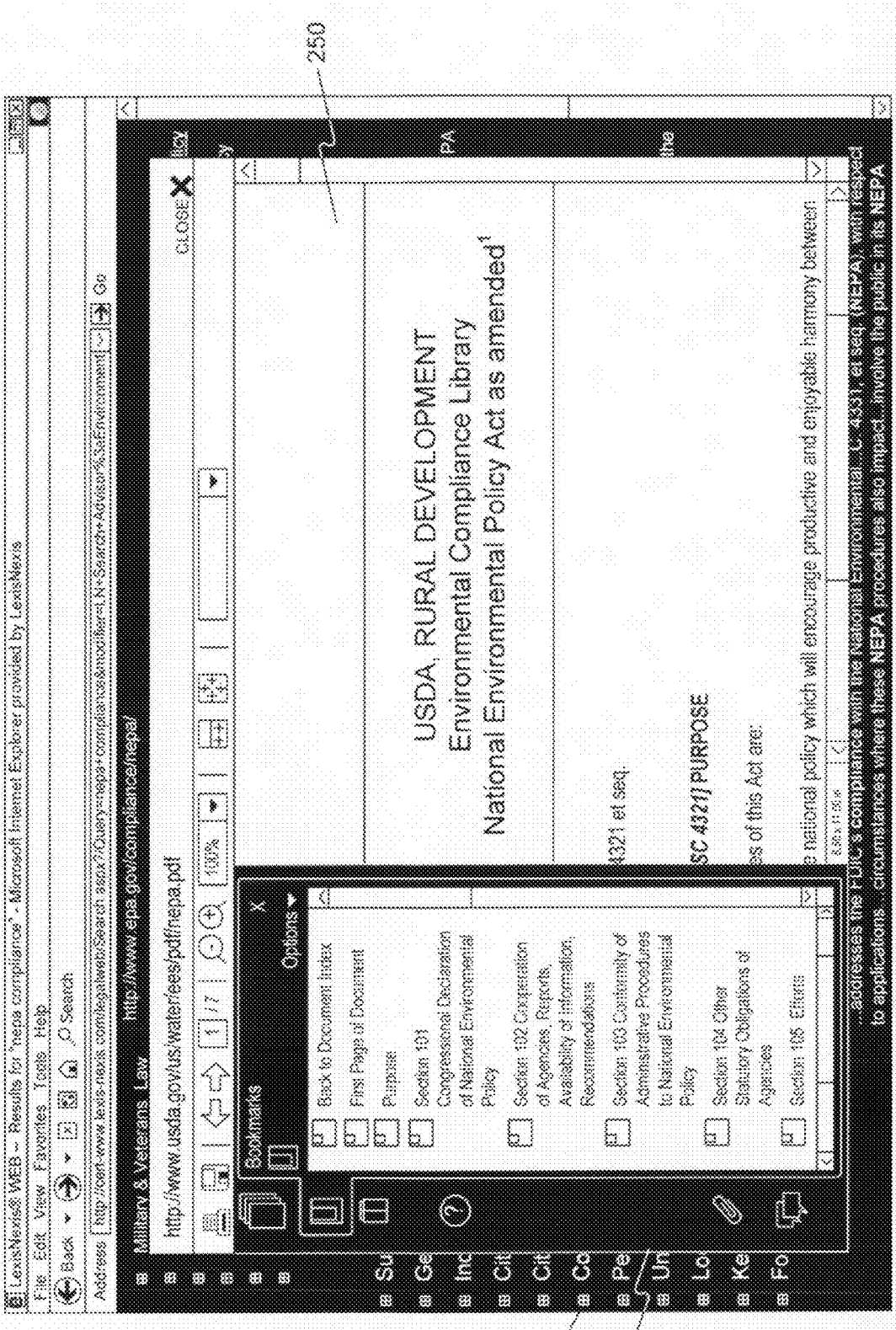
Figure 21:
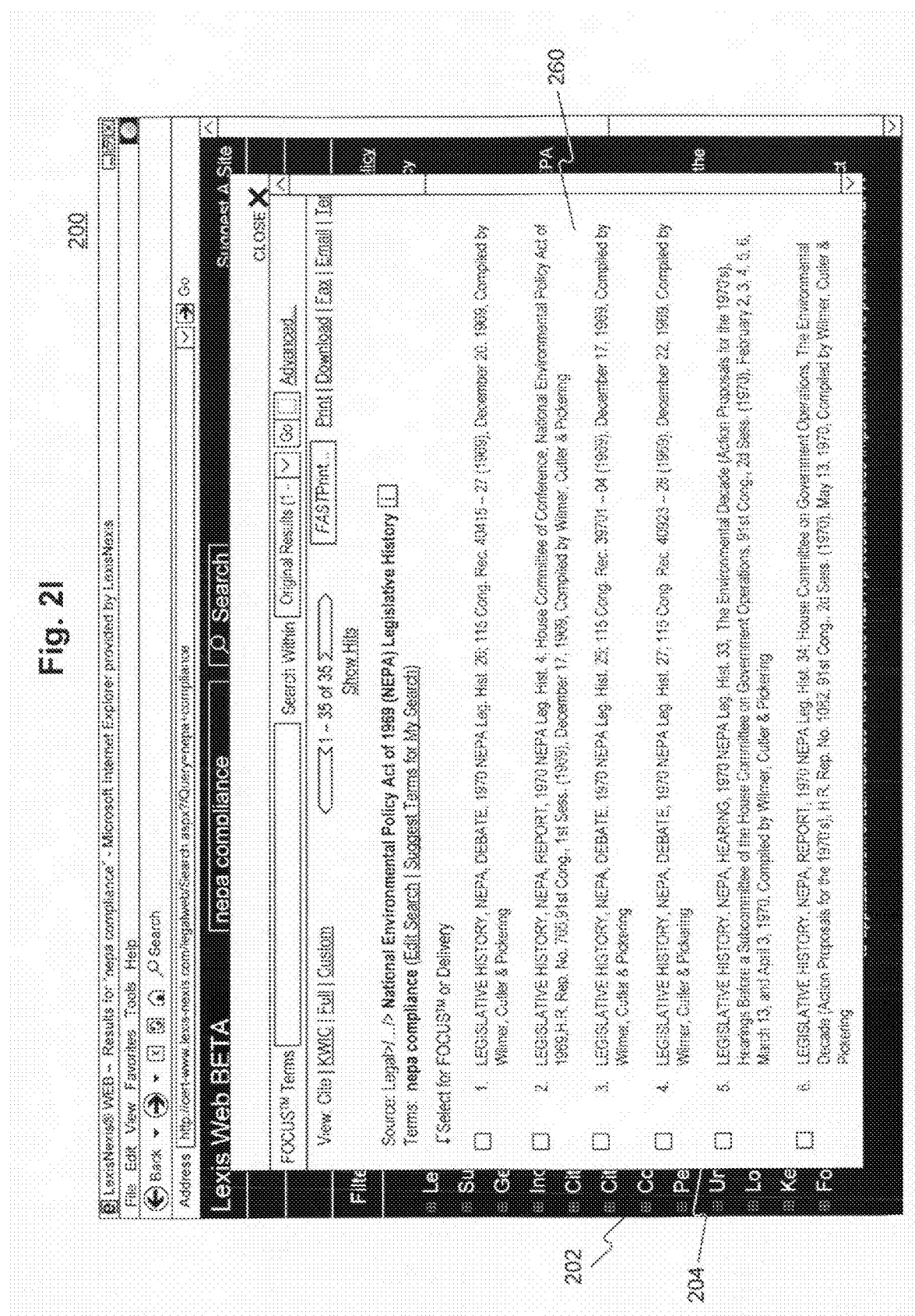
Figure 2M:
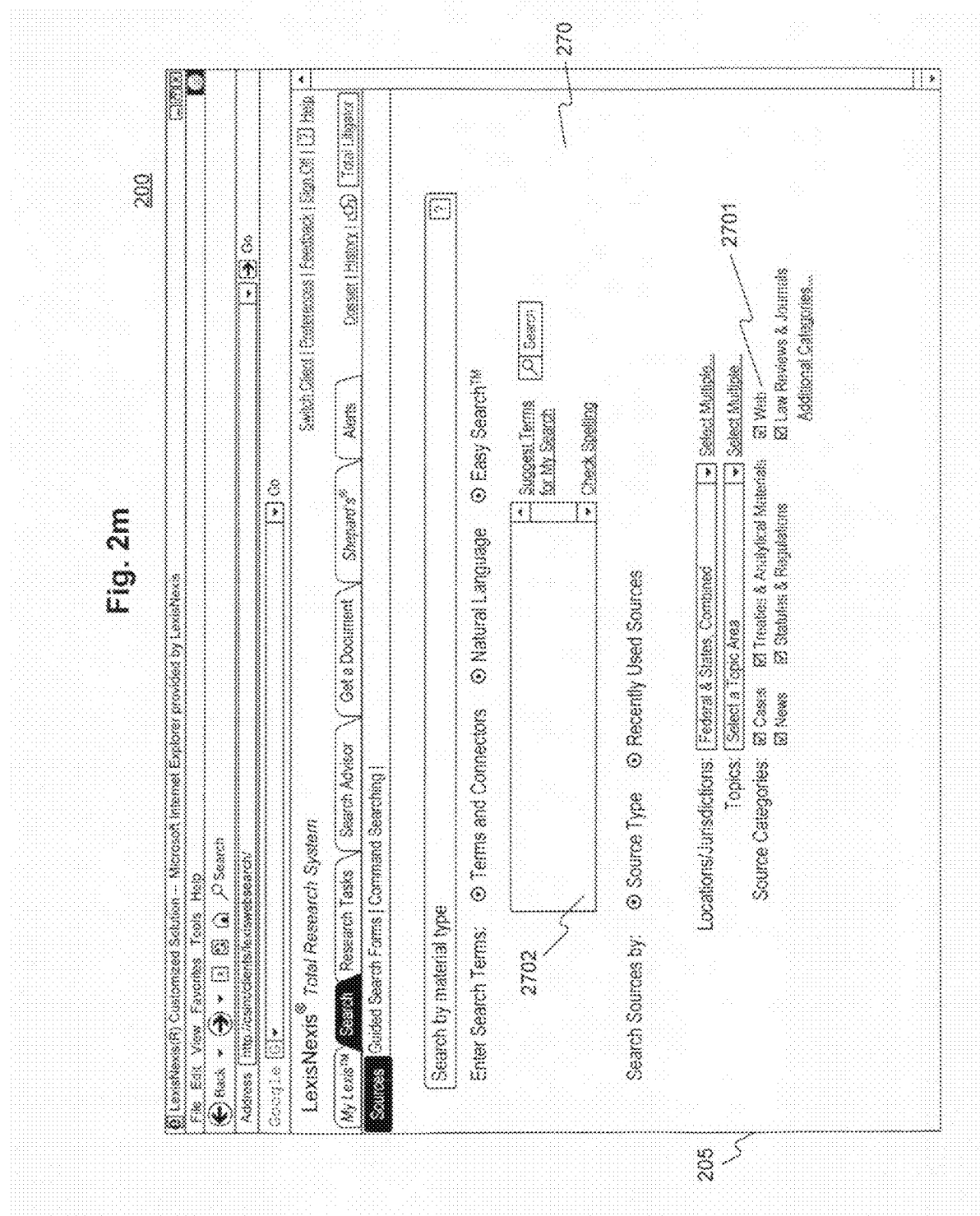
Figure 2N:
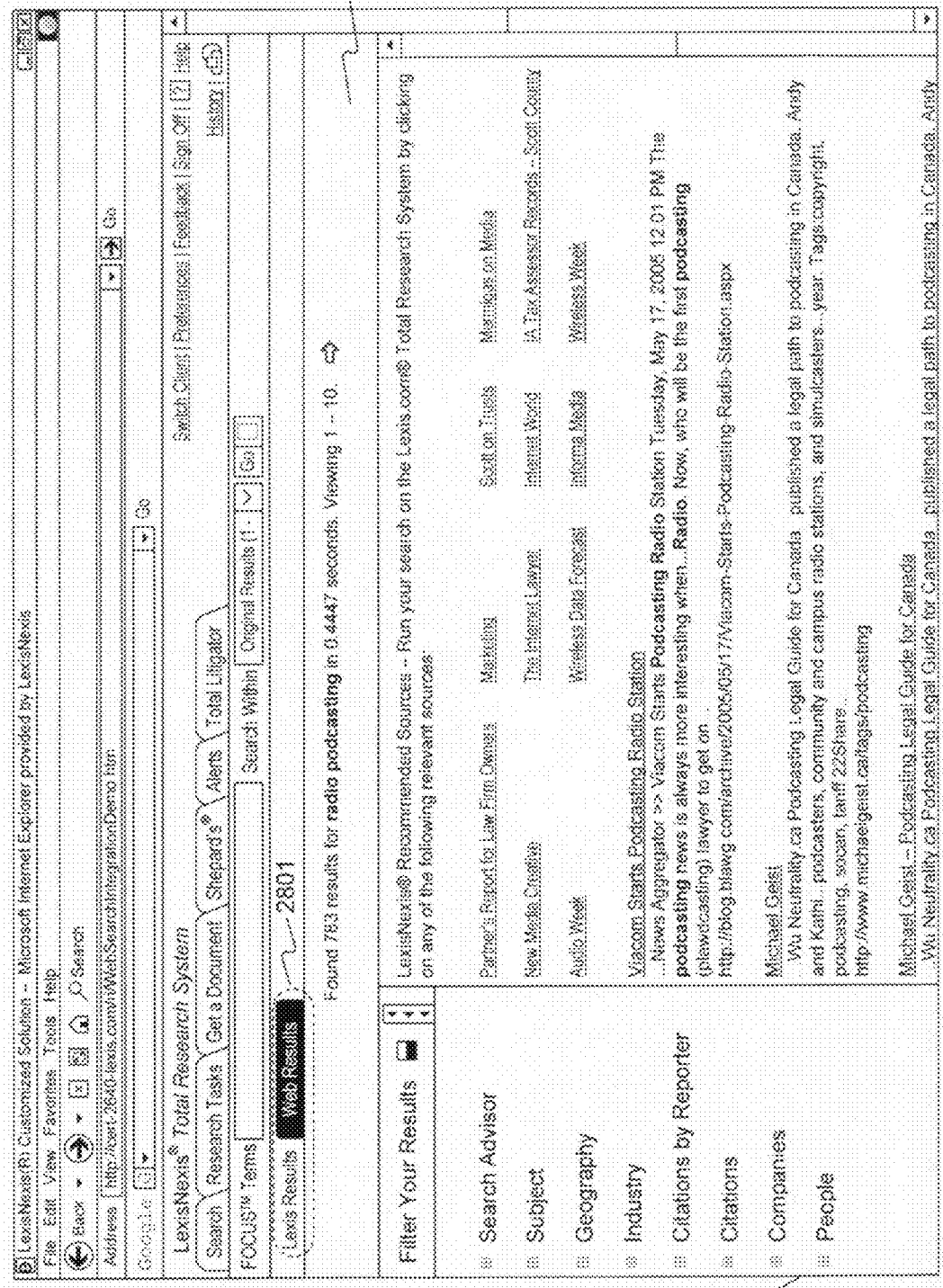

FIGS. 2*a*-2*n* depict an exemplary graphical user interface (GUI) 200 for implementing search tool 122 to search for, filter, and retrieve law-related documents. In one embodiment, GUI 200 may be implemented using a Web browser or other browser program, and may include a number of windows for implementing a search. For example, FIG. 2*a* depicts an initial search query window 201, FIGS. 2*b*-2*i* depict a search results window 202, FIGS. 2j and 2k depict a document view window 203, FIG. 2l depicts a recommended source search window 204, FIG. 2m depicts an integrated search query window 205, and FIG. 2n depicts an integrated search results window 206.

FIG. 2a depicts a search query window 201 for entering an initial search by a user. In one embodiment, search query window 201 includes search entry box 2011 and search button 2012. A user may input text (e.g., one or more terms, using optional boolean expressions or other known search expressions) into search entry box 2011 and select search button 2012 to execute a search for the entered text. Although a search entry box and search button are shown, other mechanisms for initiating a search query may be used.

In response to an executed search query, a search results window, such as search results window 202 depicted in FIG. 2b may be displayed. Search results window 202 may include information related to a result set of documents retrieved as a result of a search entered by a user. For example, in one embodiment, search results window 202 includes a result set portion 210, a filter portion 220, and a recommended source portion 230.

Result set portion 210 includes a list of documents retrieved as a result of a search. For example, in response to a search query, search tool 122 may search for documents from document set 110-1 through 110-n that include the term or terms of the search query. A scrollable list of resulting documents may be returned to GUI 200. For example, as depicted in FIG. 2b, a search for "nepa compliance" was executed, and the result set includes 1,629 documents. The result set is displayed in result set portion 210 of search results window 202 as a scrollable, navigable list of documents. In one embodiment, a user may navigate through the list using navigation buttons 2101 and/or scroll bar 2102.

In one embodiment, a user may select a document included in the result set list (e.g., by clicking on a link, etc.) in order to view the document. In response, a document view window 203, such as depicted in FIGS. 2j and 2k may be displayed. The document view window 203 is described further below.

In certain situations, a search may result in a large number of results (e.g., thousands, hundreds of thousands, etc.). Using filter portion 220 of the search results window 202, a user may filter the result set to search for particular categories of documents.

In one embodiment, filter portion 220 includes hierarchical, expandable filters that can be selected to narrow search results. The filters may be organized according to different taxonomies. A user may then select one or more categories or sub-categories within one or more of the taxonomies to filter search results.

For example, in one embodiment, the different taxonomies include filtering documents according to legal topic (e.g., criminal law and procedure, computer and Internet law, governments, communications law, patent law, etc.); subject (e.g., science and technology, law and legal systems, government and public administration, etc.); geography (e.g., continent, country, state, or other geographical region); industry (e.g., energy and utilities, health care, etc.); citations included in the documents (e.g., statutes, court decisions, etc.); company; person; university; language; keywords or phrases; document source or type of source (e.g., online newspaper, online blog, or government website, or a particular Web site, particular blog, etc.); or other taxonomies.

In one embodiment, a user may use filter portion 220 to select one or more taxonomies and/or categories within the taxonomies to narrow the results of a search. For example, as depicted in FIG. 2c, a user may select the "legal topic" taxonomy, in which case a hierarchical list 2201 of categories representing different legal topics may be displayed. In one embodiment, the categories included within the selected taxonomy for a particular result set of documents are only categories that are associated with at least one of the documents in the result set. In other words, a search for "nepa compliance" may return documents that have been indexed as being related to environmental law, government, energy & utilities, etc., but may not return any documents related to family law. In such a case, the categories of environmental law, government, energy & utilities, etc., are included in the legal topic taxonomy and may be displayed in filter portion 220 of search results window 202 for the "nepa compliance" search query, but a category for family law will not appear.

In one embodiment, when a taxonomy is selected, a predetermined number of categories maybe initially shown (e.g., five, ten, etc.), but the list of categories may be expanded by a user selection (e.g., by selecting the a "see more results" link, such as depicted in list 2201). In one embodiment, in addition to a list of the categories, an indication of the number or percentage of the documents in the result set that are classified in each category is also shown. The displayed categories may be ordered based on these numbers or percentages. In this way, a user can immediately and easily determine which categories in the taxonomy are most prevalent for the terms included in the search query. For example, as depicted in FIG. 2c, the legal topics that are most frequently associated with the result set from the "nepa compliance" search query are environmental law, governments, and energy and utilities law, shown with bars indicating a relative frequency of occurrence for each legal topic. By depicting the search results according to legal topic, search tool 122 organizes the disparate, decentralized legal content publicly available on the Web in a manner that expedites the review of documents related to particular legal fields. As a result, a user need not separately search different government sites, blogs, and newspaper and magazine sources, but instead can use search tool 122 to quickly search for only the relevant topics of legal content on the Web that the user desires.

Each category within a taxonomy may include additional sub-categories, which may also be used to further filter search results. For example, as depicted in FIG. 2d, a hierarchical list 2202 of sub-categories for the environmental law category has been selected (e.g., National Environmental Policy Act, Natural Resources & Public Lands, etc.). A user may filter the search results by selecting one or more categories and/or sub-categories. In one embodiment, upon selection of a category or sub-category for filtering, the results list displayed in result set portion 210 of search results window 202 is updated to only include those documents matching the category or sub-category, and the selected category or sub-category may be displayed in an applied filter portion 240 of search results window 202 (shown, for example, in FIG. 2e). In this way, applied filter portion 240 indicates to a user which filters have been applied to the result set.

FIG. 2e depicts an exemplary search for which the search results were filtered based on two different sub-categories within the legal topic taxonomy. As a result, in the example of FIG. 2e, only three documents remain that match both of the selected sub-categories. In one embodiment, additional filter categories or sub-categories can be added (e.g., by selecting a link or other selection object) and existing applied filter categories or sub-categories can be removed (e.g., by selecting a delete icon or other selection object within applied filter portion 240).

Filter portion 220 of search results window 202 may also permit a user to filter search results based on subject (depicted in FIG. 2*f*), geographical location (depicted in FIG. 2*g*), industry (depicted in FIG. 2*h*), and other taxonomies. In addition, multiple filters may be applied from different taxonomies. For example, the user may select a particular legal topic from the legal topic taxonomy and also select a geographical location from the geographical taxonomy to narrow a set of search results.

In one embodiment, filter portion 220 of search results window 202 additionally includes a taxonomy for filtering search results according to citations. As described previously, each law-related document may include citations to one or more sources and/or sections or sub-sections within those sources (e.g., reporters, statutes, rules, court cases, websites, blog sites, etc.). A user may therefore narrow search results based on the citations included in the documents of the search results, and may also view the number of cites to particular sources or sections and sub-sections within those sources for a result set of documents.

For example, as depicted in FIG. 2*i*, the "Citations by Reporter" taxonomy has been selected. As a result, a hierarchical citation list 2203 of reporters and statutes is displayed. Citation list 2203 represents a set of citations present in the result set of documents for the selected search. In one embodiment, citation list 2203 may be organized hierarchically to include at one level a publication category (e.g., law reporter, etc.), at another level a citation sub-category (e.g., statutes, rules, court decisions, etc.). Each level of the hierarchy may be expanded or contracted. In another embodiment, only a single level may be included for all of the citations (e.g., by selecting the "Citations" taxonomy shown in FIG. 2*b*), the single level including a category for each citation without including a level for publications.

In either embodiment, an indication of the percentage or number of times each citation was cited in the document set may be included, thereby serving as a visual aid to quickly indicate to a user which statutes, court decisions, etc., are most often cited for the result set. Although FIG. 2*i* only depicts bars indicating a relative number of cites for each citation, an indication of the actual number of cites for each citation, or the percentage of cites to each citation compared to the total number of cites in the result set may be included as well. As a result, a user can immediately determine which statutes, rules, court decisions, etc., are most often cited in documents related to a particular search term. For example, a user may wish to determine which statute is most often cited in documents related to "nepa compliance." Thus, to do so, as depicted in FIGS. 2*a*, 2*b* and 2*i*, the user need only enter the term "nepa compliance" as a search query, and select "Citations by Reporter" or "Citations" as a filter, and search tool 122 provides a search results window 202 that displays a list of the statutes cited in the result set for "nepa compliance" in order from most frequently cited to least frequently cited.

In one embodiment, a user may select a publication or citation displayed in citation list 2203 (e.g., by selecting a link) in order to filter the search results to include only documents that include the selected citation. In response, result set portion 210 of search results window 202 will display a list of search results which include the selected citation. The resulting search results may then be further filtered according to one or more additional categories or sub-categories from filter portion 220.

In a further embodiment, a user may alternatively or additionally select a link for each citation in citation list 2203 to further research the citation (e.g., view the citation, search for documents that cite to the citation, determine whether the citation, if a legal citation, is still valid, etc.). For example, a user may select a link to search for documents that cite to the a particular citation to determine whether the citation is still valid, which may cause a pop-up window to appear for a proprietary search tool (e.g., a LexisNexis® proprietary legal search tool), which permits a user to perform the appropriate analysis.

At any point when a list of one or more documents is displayed in result set portion 210 of search results window 202, a user may view a listed document by selecting a link or other selection object for the listed document. Upon selection of one of the listed documents, search tool 122 retrieves the selected document (e.g., from its source on the Internet or from local storage on central computer system 120), and transmits the document to the user at one of computer systems 130-1 through 130-*n* for display.

As depicted in FIG. 2*j*, a selected document 250 may be displayed in document view window 203. In one embodiment, document view window 203 is overlaid over search results window 202. As a result, a user may view the selected document without the need to open a new browser window. The user can navigate within the selected document in the same way a user navigates in a standard Web browser (e.g., selecting links, entering text into text boxes, scrolling, etc.). In one embodiment, while a user is navigating a selected document in document view window 203, the user cannot make any selections in search results window 202. Document view window 203 may be closed, for example, by selecting a "close" selection object, which returns the display to search results window 202. In one embodiment, document view window 203 is implemented using computer code such as AJAX, for example.

A selected document 250 may be displayed in document view window 203 in different formats, depending on the type of document. For example, an HTML-type document may be displayed in document view window 203 as a standard HTML web page. However, a PDF-type document, or word processing or spreadsheet-type document may be displayed in document view window 203 as it would appear in its native format. For example, FIG. 2*k* depicts a PDF-type document displayed with a review window, a table of contents window, and various tool bars and icons that would be displayed in a native, non-web-based format.

Turning back to search results window 202, when viewing search results window 202, a user may suggest one or more documents to be added to the set of documents 110-1 through 110-*n*. For example, should a user know of a URL on the web that includes legal content, the user may select a "Suggest A Site" link or the like, which permits the user to send a message to central computer system 120 to request that one or more pages associated with the URL be added to the set of documents 110-1 through 110-*n*. The request may be reviewed by an administrator, who may then add the URL and/or related URLs to the set of documents 110-1 through 110-*n*.

In one embodiment, search results window 202 includes recommended source portion 230. Recommended source portion 230 includes a list of a number of sources that may be of particular relevance to the entered search query. For example, as shown in FIG. 2*b*, for a search for "nepa compliance," recommended source portion 230 includes a number of sources (e.g., Natural Gas Week, Foster Natural Gas Report, National Environmental Policy Act of 1969 (NEPA) Legislative History, etc.), which may be likely to include information related to the entered search query. System 100 may include any number of sources which can be recommended as a result of a search. Sources may include legal sources, such as treatises, industry specific journals, government web sites, etc., or other topical sources. A user may not be aware of all of the available sources in which to search for documents, so recommended source portion 230 serves as an aid for recommending topically relevant sources.

In one embodiment, a user may select one of the sources listed in recommended source portion 230 to search that source using the terms included in the search query. One or more of the recommended sources may be searchable only using a proprietary search tool (e.g., a fee-based service that may require a username, password, etc.). If one of these sources is selected and a user is not already logged in to the proprietary search tool, the user may be prompted for login information (e.g., username, password, etc.). If a user is already logged into the proprietary search tool, however, then no further login information may be necessary, and the search terms from the search query may be automatically included in a search query for the selected source. In one embodiment, the terms from the initial search query are input into a search entry box for the selected source, and a user may review the search terms before selecting to execute a search in the selected source. In another embodiment, the terms from the initial search query are automatically used to execute a search query in the selected source, without user intervention.

FIG. 2l depicts exemplary search results 260 for a search in a selected source, displayed in a recommended source search window 204. Window 204 may be overlaid over search results window 202, may take over GUI 200 in place of search results window 202, or may appear in a new browser window. In the example depicted in FIG. 2l, search results 260 include search results from a selected source (e.g., National Environmental Policy Act of 1969 (NEPA) Legislative History) from recommended source portion 230 of search results window 202, for the search terms initially entered into search entry box 201l. A user may select one or more of the search results to view the resulting document.

As described above, the sources returned as recommended sources may include sources available to subscribers of a proprietary search tool. Therefore, in one embodiment, an integrated search query window 205 as shown in FIG. 2m may be included as part of a proprietary search tool. Integrated search query window 205 may include a search form 270 that includes features available for the proprietary search tool (e.g., search query entry portion 2702, source selection buttons for the search, etc.) and may also include a selection box, such as box 2701, that instructs the system to search the web for publicly available documents, such as documents 110-1 through 110-n discussed previously.

If the user selects selection box 2701 and executes a search, a window such as integrated search results window 206 depicted in FIG. 2n may be displayed. Integrated search results window 206 shows tabs 2801 which may be alternately selected to view either proprietary search results (e.g., "Lexis Results") or non-proprietary results (e.g., "WebResults"). As shown in FIG. 2n, web search results 280 are displayed in response to a search executed using an integrated search query window integrated with a proprietary search tool. The search results 280 are in the same format as the search results depicted in search results window 202, except that search results 280 are displayed as one tab that is a portion of an integrated search results window 206. Within the selected tab, a user may perform one or more of the steps discussed previously to view a document, filter a search, search a recommended resource, etc. Integrated search results window 206 may be used to avoid the need to require a login into the proprietary search tool when a user selects a recommended resource in recommended source portion 230. Therefore, if a user selects a recommended source from integrated search results window 206, the resulting search results may be automatically displayed in the "Lexis Results" tab or another tab that is part of the proprietary search product.

The sources that appear in recommended source portion 230 may be determined according to one or more selection methods. For example, in one embodiment, the recommended sources are determined based on a search-results-based analysis.

In a search-results-based analysis, a result set of documents responsive to and retrieved as a result of a search query (e.g., based on entered search terms) may be analyzed to determine which sources to recommend in recommended source portion 230. For example, each resulting document has associated document information that may be indexed (e.g., an associated term vector that includes a set of terms and keywords extracted from the document). In addition each resulting document may have an associated source tag that indicates one or more recommended sources related to the document. The source tag may be added as metadata to the document by the document author, an administrator, or other manual or automatic procedure.

Central computer system 120 may additionally store a source database including sources and one or more keywords and/or concepts associated with each source. In one embodiment, the source database is constructed by sampling documents from each topical collection or source, and extracting keywords or phrases from each sampled document. The keywords and phrases may then be combined for the set of sampled documents to determine keywords, topics, and/or concepts associated with the source. In one embodiment, the keywords, topics, and/or concepts may be organized in a prioritized manner based on the frequency of occurrence of the extracted keywords and phrases, and may be stored in a database or other data store as a term vector.

In one embodiment, to determine a recommended source for a search query, the result set of retrieved documents for the search query is analyzed to determine, based on each document's associated source tag, which sources are most frequently associated with the result set of documents. In another embodiment, instead of analyzing source tags, the document information for each document in the result set is analyzed to determine a most frequent set of document information. The most frequently occurring document information among the documents in the result set, which may be stored as a term vector, may then be compared to the term vector associated with each source in the source database to determine which sources are most likely to be relevant to the result set of documents. For example, sources having term vectors in the source database with the highest degree of similarity to the term vector representing the result set of documents may be included as recommended sources.

In one embodiment, additional analyses or algorithms may be used in order to select the recommended sources. For example, a combined analysis may be used that determines both a most frequent source tag, and most frequent document information for a result set of documents, and assigns a certain weight to the source tags and a certain weight to the document information to determine which sources are most relevant to the search query. As another example, each document in the result set may be assigned a weight value, such that source tags or document information in that document may carry more weight towards determining a most relevant source. For example, documents that include a plurality of occurrences of an entered search term may be given more weight than documents that include only one occurrence of the search term. Furthermore, in one embodiment, user information or other profile data for a user performing a search may indicate that a particular user prefers certain sources, or only subscribes to certain sources. In such a case, those sources can be included in the list of recommended sources, or can be given priority in the list of recommended sources (e.g., placed at the top of the list, etc.).

Figure 3A:
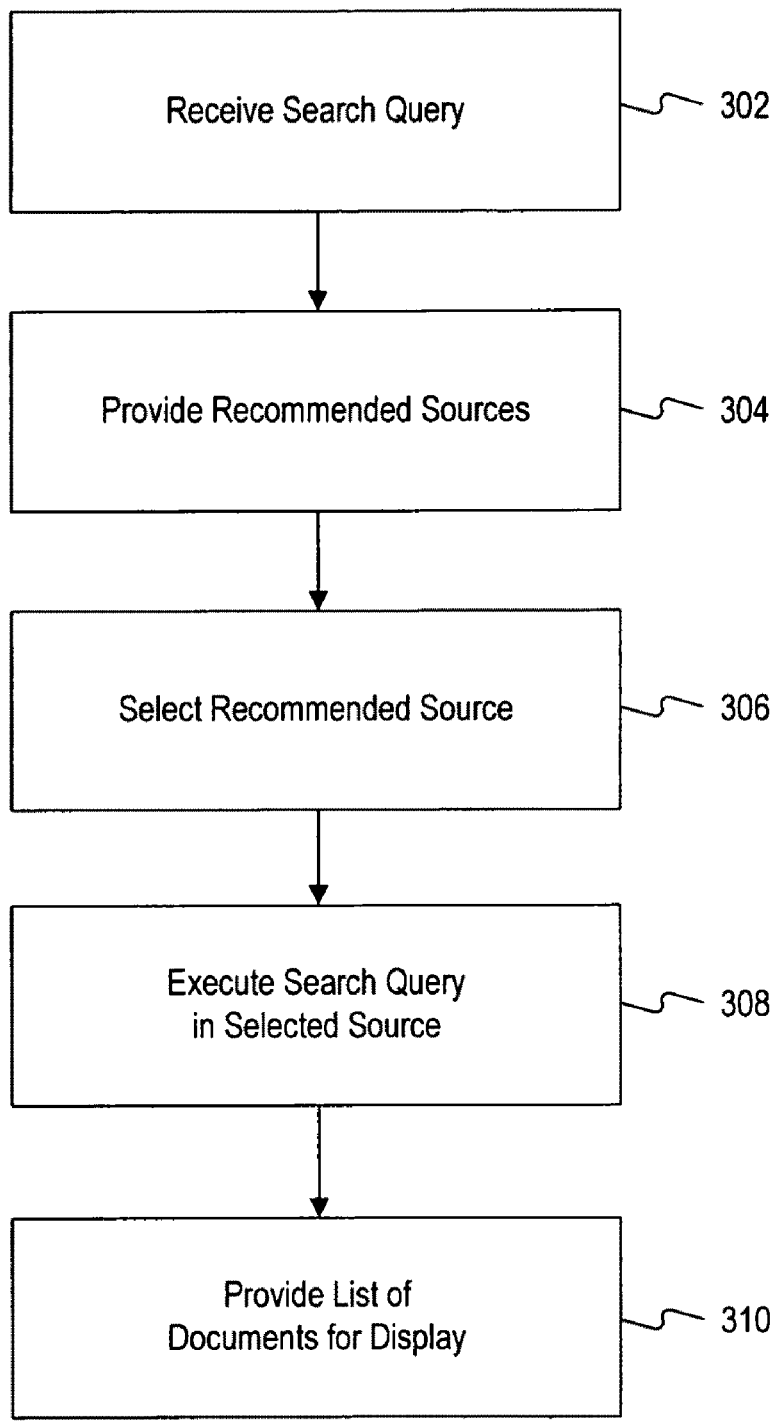
FIGS. 3a and 3b illustrate methods of using a search tool, consistent with certain disclosed embodiments.
Figure 3B:
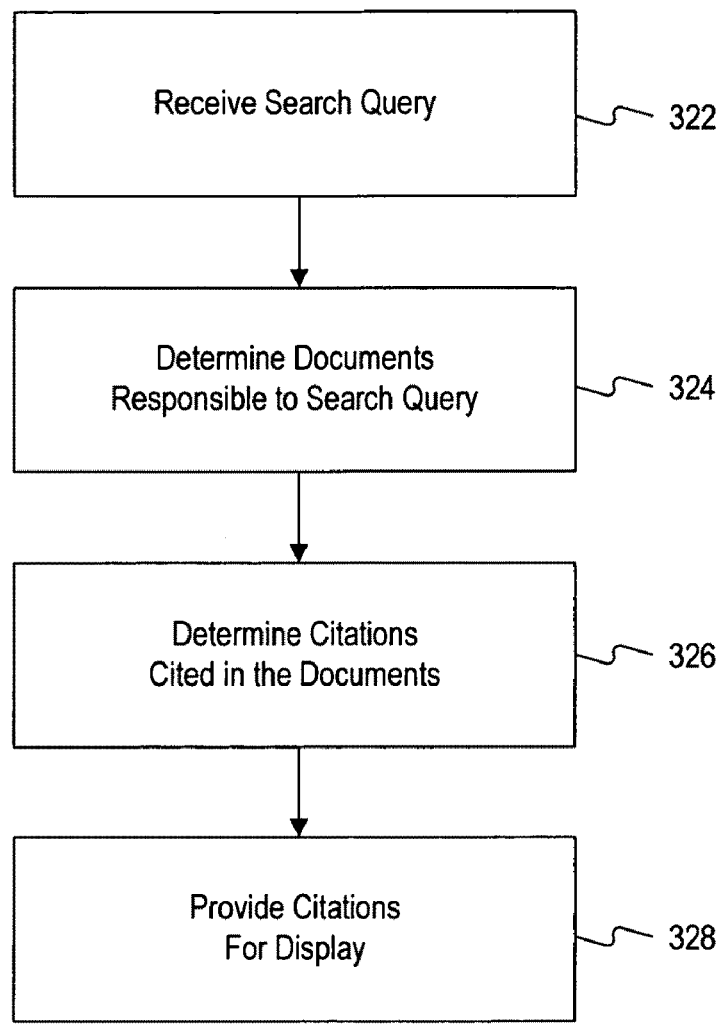

Exemplary methods for performing searches are depicted in FIGS. 3a and 3b. In one embodiment, the described methods may be carried out using the GUI 200 and system 100 described above.

For example, FIG. 3a depicts a method for searching for documents. In step 302, central computer system 120 may receive a search query. For example, in one embodiment, the search query may include one or more search terms received from a search query window (e.g., search query window 201) of a user computer (e.g., one of user computer systems 130-1 through 130-$n$).

In step 304, a set of recommended sources may be determined and provided to a user. For example, using one or more of the recommended source selection methods described above, central computer system 120 may determine a set of recommended sources based on entered search terms and/or selected filters. The recommended sources may then be provided (e.g., transmitted over network 140) for display at one of user computer systems 130-1 through 130-$n$, to be displayed, for example, on GUI 200, as a list of sources in a recommended source portion 230 of a search results window 202.

In step 306, one of the displayed recommended sources is selected. For example, the recommended source may be selected by a user clicking on a link or other selectable object for the recommended source.

In step 308, based on the selected source, a search query may be executed in the selected source. For example, as discussed above, the search query may include the same terms as the initial search query received from search query window 201. In one embodiment, the selected source may be a proprietary search tool which requires a user login (e.g., either prior to the beginning of method 300 or during method 300). In addition, the search query executed in the selected source may be executed automatically (e.g., without a user re-entering search terms or selecting a search link) or may be executed with some user interaction (e.g., with a user changing or entering search terms and/or selecting a search link).

In step 310, the results of the search query may be provided for display. For example, the results may be provided as a list of responsive documents obtained from the selected source and which include the search terms. The results may be provided in a window such as, for example, recommended source search window 204 shown in FIG. 2l. In an alternative embodiment, the results may be displayed in an integrated search tool (e.g., integrating a proprietary search tool and a public search tool), such as depicted in FIGS. 2m and 2n. The results may be provided, for example, to one of user computer systems 130-1 through 130-$n$.

FIG. 3b depicts a method for searching for documents, including determining citations cited in the documents. For example, in step 322, central computer system 120 may receive a search query. For example, in one embodiment, the search query may include one or more search terms received from a search query window (e.g., search query window 201) of a user computer (e.g., one of user computer systems 130-1 through 130-$n$).

In step 324, central computer system 120 may determine a result set of documents that is responsive to the search query. For example, a set of documents 110-1 through 110-$n$ may be responsive to the search query.

In step 326, central computer system 120 may determine a set of citations included in the documents that are responsive to the search query. For example, the citations may be determined in response to a user's selection of a "Citation" taxonomy, and may be collected by a webcrawler or other analysis program that extracts data having recognized citation formats from the documents. The citations may be stored and compiled as a list, such that each citation for the set of citations may be listed along with a frequency of occurrence for the citation within the set of documents.

In step 328, the set of citations is provided for display. For example, central computer system 120 may transmit the citations to a user computer for display in filter portion 220 of search results window 202. In one embodiment, the citations may be displayed alongside the responsive set of documents, such as depicted in search results window 202 of FIG. 2i. The displayed list may be organized, in one embodiment, based on frequency of citation occurrence, and may include an indicator of the frequency, such as an indicator bar (e.g., indicating relative frequency compared to other citations), a number of occurrences, or a percentage value. As such, the user can determine the frequency of occurrence of the citations simply by viewing the displayed list and without having to perform any further selections or analysis.

Additional methods may be performed as well, in accordance with the system 100 and GUI 200 described above. For example, steps of method 300 and 302 can be combined, such that a search is performed based on one or more search terms, search results are determined, the search results are filtered according to one or more citations (and/or one or more other categories), a list of recommended sources is then provided based on the result set retrieved using the original search terms and the selected filter category, and a second search is then performed in a selected recommended source.

As another example, one or more of the methods described above may additionally be combined with the selection of one or more categories from the "Legal Topic" taxonomy, such that a set of documents may be filtered to include only documents associated with a desired legal topic or set of legal topics. In providing such a filter, search tool 122 may be used to organize the heterogeneous legal content existing on the web so it can be searched and reviewed in a focused, efficient manner.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments may be implemented as a combination of hardware and software or in hardware alone. Examples of hardware include computing or processing systems, including personal computers, servers, laptops, mainframes, micro-processors and the like. Additionally, one skilled in the art will appreciate that aspects of the disclosed embodiments can be stored on a computer's memory storage system, or on other computer readable media, such as secondary storage devices, for example, hard disks, floppy disks, or CD ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, HTML, HTML/AJAX combinations, XML, or HTML with included Java applets. One or more of such software sections or modules can be integrated into a computer system or existing browser software.

Moreover, while illustrative embodiments have been described herein, the scope includes any and all embodiments having equivalent elements, modifications, omissions, combinations (e.g., of aspects across various embodiments), adaptations and/or alterations as would be appreciated by those in the art based on the present disclosure. For example, though user computer systems 130-1 through 130-*n* and central computer system 120 are depicted as separate entities in communication over a network, one or more of computer systems 130-1 through 130-*n* and central computer system 120 may be included in a single device or system without departing from the spirit and scope of the disclosed embodiments.

The recitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope of equivalents.

What is claimed is:

1. A method for searching for documents, comprising:
   receiving a search query entered into a search query window, the search query including one or more search terms;
   determining a set of documents responsive to the search query;
   determining a set of citations cited in the set of documents by extracting data having recognized citation formats from the set of documents;
   providing a displayed list of the set of citations that enables determination of the most frequent citation by a user viewing the displayed list;
   based on the one or more search terms, providing for display a set of one or more recommended sources in which to search for documents;
   receiving a selection of a recommended source from the set of one or more recommended sources;
   based on the selection of the recommended source, executing a second search query in the selected recommended source, the second search query including the one or more search terms; and
   providing for display a list of one or more documents in response to the second search query.

2. The method of claim 1, wherein:
   the displayed list of the set of citations includes, for each citation in the set of citations, the citation and an indication of the frequency that the citation appears within the set of documents.

3. The method of claim 1, wherein the set of documents is a set of law-related documents publicly available on the Internet, and further including:
   determining a set of legal topics associated with the set of law-related documents and providing for display the set of legal topics.

4. The method of claim 1, further comprising:
   receiving a selection of one of the citations; and
   in response to the selection, providing for display a list of a subset of documents, the subset of documents including documents from the set of documents that include the selected citation.

5. The method of claim 1, further comprising:
   receiving a selection of one of the citations, wherein the selected citation cites to a law-related document; and
   in response to the selection, providing for display the law-related document.

6. The method of claim 1, further comprising:
   receiving a selection of one of the citations; and
   in response to the selection:
   providing for display a list of a subset of documents, the subset of documents including documents from the set of documents that include the selected citation, and
   providing for display a set of one or more recommended sources in which to search for documents.

7. The method of claim 6, wherein:
   the set of one or more recommended sources is determined based on the search terms and the selected citation.

* * * * *